United States Patent
Jackson et al.

(10) Patent No.: US 9,341,217 B2
(45) Date of Patent: May 17, 2016

(54) BEARING RACEWAY HEAT DISTRIBUTION USING HEAT PIPES

(71) Applicant: BELL HELICOPTER TEXTRON INC., Forth Worth, TX (US)

(72) Inventors: Kenneth Myron Jackson, Euless, NY (US); Monte Alan McGlaun, Abilene, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 159 days.

(21) Appl. No.: 14/266,918

(22) Filed: May 1, 2014

(65) Prior Publication Data

US 2015/0316106 A1    Nov. 5, 2015

(51) Int. Cl.
  *F16C 19/00* (2006.01)
  *F16C 37/00* (2006.01)
  *F28D 15/04* (2006.01)

(52) U.S. Cl.
  CPC ............. *F16C 37/007* (2013.01); *F28D 15/04* (2013.01)

(58) Field of Classification Search
  CPC ......... F16C 37/00; F16C 37/007; F28D 15/04
  USPC .................................. 384/467, 476, 900, 905
  See application file for complete search history.

(56) References Cited

U.S. PATENT DOCUMENTS

| | | | | |
|---|---|---|---|---|
| 2,352,206 A | * | 6/1944 | Kendall | F16C 37/007 384/476 |
| 3,706,483 A | * | 12/1972 | Irwin | F16C 37/007 384/448 |
| 7,070,333 B2 | * | 7/2006 | Ito | F16C 33/6677 384/466 |
| 9,033,581 B2 | * | 5/2015 | Carter | F16C 33/6677 384/475 |
| 2006/0026504 A1 | * | 2/2006 | Balinsky | G06F 17/211 715/246 |
| 2009/0250197 A1 | | 10/2009 | Hassett et al. | |

* cited by examiner

*Primary Examiner* — James Pilkington
(74) *Attorney, Agent, or Firm* — James E. Walton

(57) ABSTRACT

A system and method to cool a bearing. The system includes a heat pipe extending through a thickness of an inner ring of the bearing from a first surface to an opposing second surface and a cooling lubricant in fluid communication with the first surface. The method includes exposing the first surface of the roller bearing to lubricant and transferring heat energy through the heat pipes.

16 Claims, 5 Drawing Sheets

BEARING RACEWAY HEAT DISTRIBUTION USING HEAT PIPES

BACKGROUND

1. Field of the Invention

The present application relates generally to cooling systems for bearings, and more specifically, to a bearing cooling system using heat transfer pipes.

2. Description of Related Art

Bearings are well known in the art and are effective means to allow rotational movement of one body relative to another. It should be understood during high speed use, the bearings create a significant amount of heat, which in turn requires a cooling system to avoid failure. In some embodiments, the cooling system is provided with a jet that injects a stream of lubricate fluid on the bearing. This embodiment has been shown to be effective in the majority of applications; however, it should also be understood that because of space restraints, some cooling systems can only lubricate one side of the bearing, while the other opposing side is not lubricated.

A common disadvantage with conventional cooling systems for bearings is the limitation that the bearing can be cooled by merely cooling one side. As such, the bearing is prone to thermal overrun, which in turn could result in catastrophic failure.

Although the foregoing developments in the field of bearing cooling systems represent great strides, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
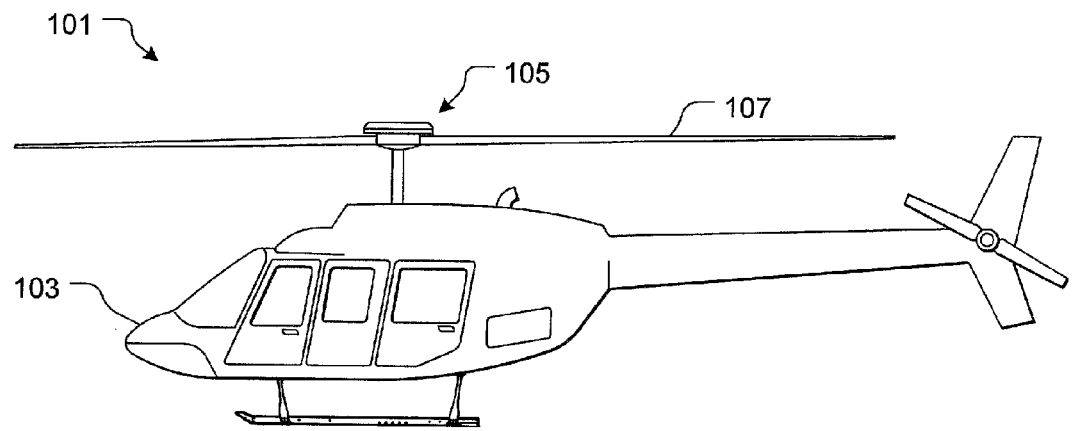
FIG. 1 is a side view of a helicopter in accordance with a preferred embodiment of the present application.

While the system and method of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the apparatus and method are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system of the present application overcomes the abovementioned problems commonly associated with conventional cooling systems for bearings. Specifically, the system of the present application includes one or more heat pipes extending through an inner ring of the bearing and configured transfer the heat from the non-lubricated side of the bearing. The system is also contemplated having an evaporator, fins, and the like attached to the heat pipes to further increase heat transfer efficiency. Further detailed description of these features are provided below and illustrated in the accompanying drawings.

The system and method of the present application will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

Referring now to the drawings wherein like reference characters identify corresponding or similar elements throughout the several views, FIG. 1 depicts an aircraft 101 in accordance with a preferred embodiment of the present application. In the exemplary embodiment, aircraft 101 is a helicopter having a fuselage 103 and a rotor system 105 carried thereon. A plurality of rotor blades 107 is operably associated with rotor system 105 for creating flight.

Figure 2:
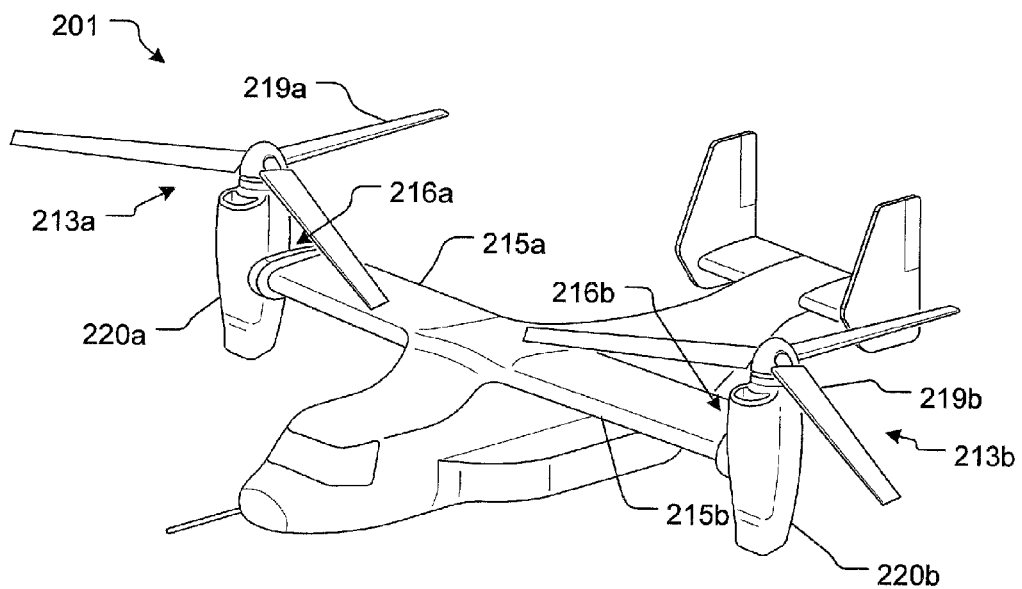
FIG. 2 is a perspective view of a tilt rotor aircraft according to an alternative embodiment of the present application.

Although shown associated with a helicopter, it will be appreciated that the system of the present application could also be utilized with different types of rotary aircraft and vehicles: For example, FIG. 2 illustrates a tilt rotor aircraft 201 that utilizes the system in accordance with the present application.

Tilt rotor aircraft 201 includes rotor assemblies 213a and 213b that are carried by wings 215a and 215b, and are disposed at end portions 216a and 216b of wings 215a and 215b, respectively. Tilt rotor assemblies 213a and 213b include nacelles 220a and 220b, which carry the engines and transmissions of tilt rotor aircraft 201, as well as, rotor proprotors 219a and 219b on forward ends 221a and 221b of tilt rotor assemblies 213a and 213b, respectively. Tilt rotor assemblies 213a and 213b move or rotate relative to wing members 215a and 215b between a helicopter mode in which tilt rotor assemblies 213a and 213b are tilted upward, such that tilt rotor aircraft 201 flies like a conventional helicopter; and an airplane mode in which tilt rotor assemblies 213a and 213b are tilted forward, such that tilt rotor aircraft 201 flies like a conventional propeller driven aircraft.

It will be appreciated that the bearing cooling systems discussed herein can be utilized with different types of aircraft, vehicles, and/or machines wherein the lubricant is applied merely on one side of the bearing.

Figure 3:
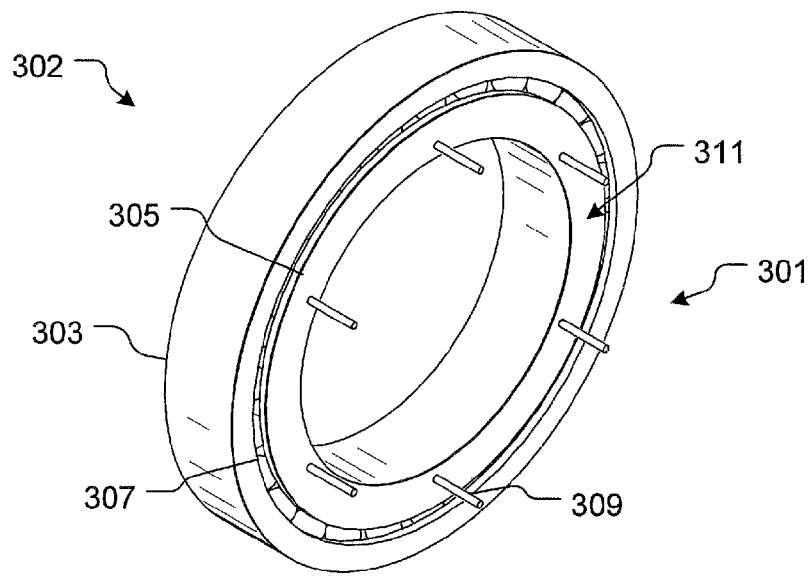
FIG. 3 is an oblique front view of bearing cooling system in accordance with a preferred embodiment of the present application.
Figure 4:
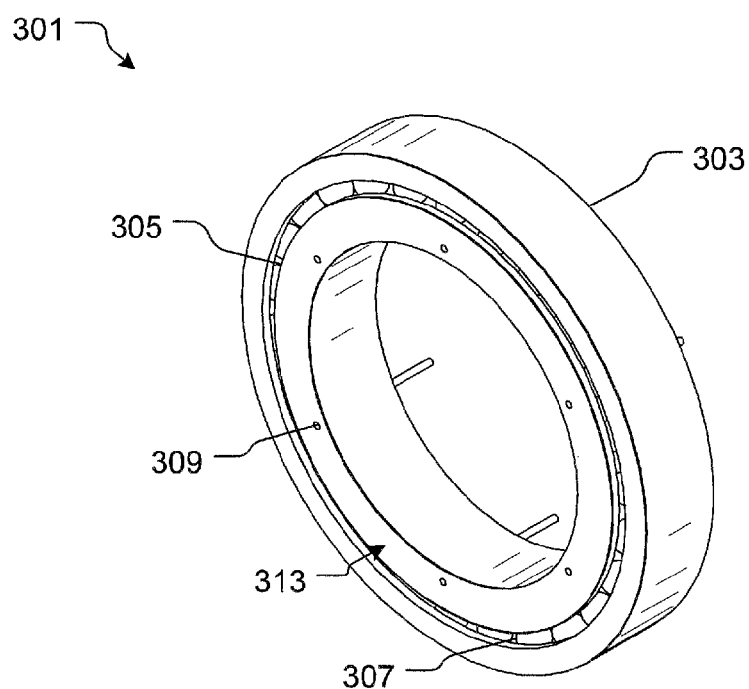
FIG. 4 is an oblique back view of the bearing cooling system of FIG. 3.

FIGS. 3 and 4 depict a simplified schematic of the bearing cooling system 301 in accordance with a preferred embodiment of the present application. In the contemplated embodiment, system 301 is operably associated with a bearing 302 having an outer ring 303 and in inner ring 305. In the contemplated embodiment, bearing 302 is a ball bearing having a plurality of roller balls 307 disposed between the inner ring 305 and the outer ring 303. Accordingly, inner ring 305 spins relative to outer ring 303 via the plurality of roller balls 307.

One of the unique features believed characteristic of the present application is the use of the cooling system 301, which in the preferred embodiment, is a plurality of heat pipes 309 attached to and extending through the thickness of inner ring 305 from a first surface 311 to a second opposing surface 313 (see, e.g., FIG. 4). Thus, it is therefore contemplated that cooling system 301 is configured to transfer heat from the two opposing surfaces and through the inner ring via the heat pipes. This feature greatly reduces the overall heat buildup of the inner ring during use and overcomes the above-mentioned problems associated with lubricant be applied solely to one side of the bearing.

It should be understood that one of the two surfaces, e.g., surface 311, is in communication with lubricant configured to cool down the bearing 302, while the opposing second surface, e.g., surface 313, is not lubricated. Utilizing the heat pipes is an effective means to allow heat transfer to cool down both surfaces and the area disposed between the surfaces. Thus, the heat pipes allow for a fast heat transfer from the hot non-lubricated side of the bearing to the lubricated side.

In the contemplated embodiment, a plurality of heat pipes are used; however, it should be understood that the number of heat pipes and the selective location of the pipes may vary in alternative embodiments. In one embodiment, the heat pipes form a hollow interior that includes a gas or fluid that increases heat transfer of the heat pipes. Alternative embodiments may include capillary wicking of liquid condensate. In yet another embodiment, the heat pipes may be formed of a solid material configured to efficiently transfer the heat energy.

Although shown attached to and extending through the inner rings 305, it is also contemplated utilizing one or more heat pipes 309 through the outer ring 303 in an alternative embodiment. It will be appreciate that the rotational movement of the inner ring 305 further increases the heat transfer via the heat pipes in the preferred embodiment.

Figure 5:
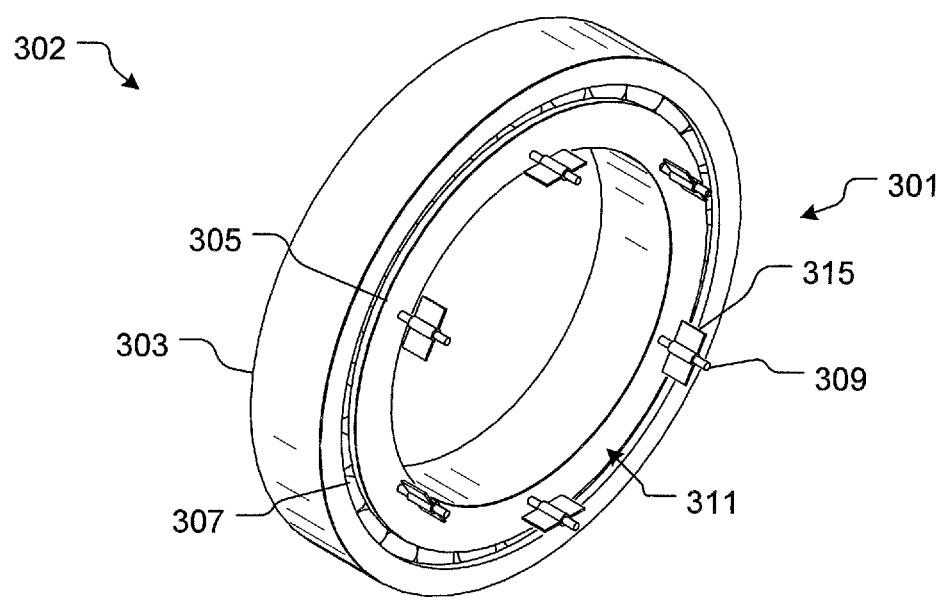
FIG. 5 is an oblique front view of a bearing system in accordance with an alternative embodiment of the present application.

In FIG. 5, an alternative embodiment of the bearing cooling system 301 is shown. As depicted, system 301 is further provided with a plurality of fins 315 securely attached to the heat pipes 309 and configured to further increase the efficiency of heat transfer by creating a larger heat transfer surface area. It will be appreciated the fins 315 can be manufactured in various shapes and sizes and should not be narrowly construed as the geometric embodiments illustrated in the drawings.

Figure 6:
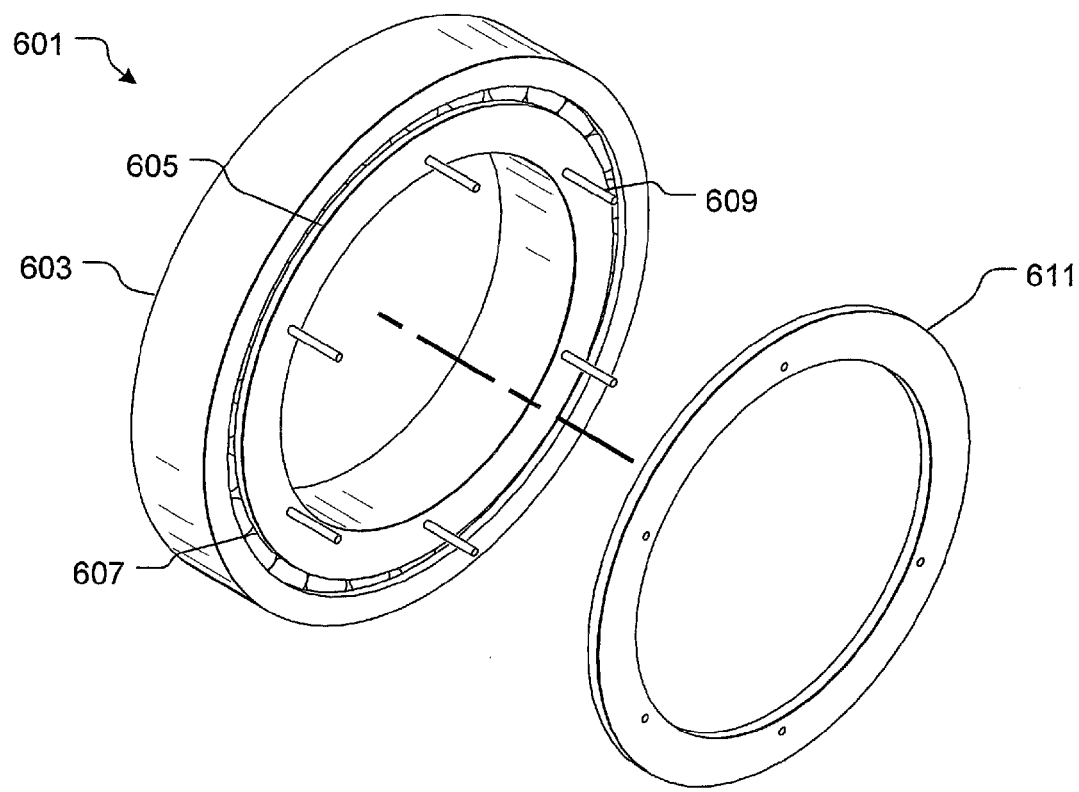
FIG. 6 is an oblique front view of a bearing system in accordance with an alternative embodiment of the present application.
Figure 7:
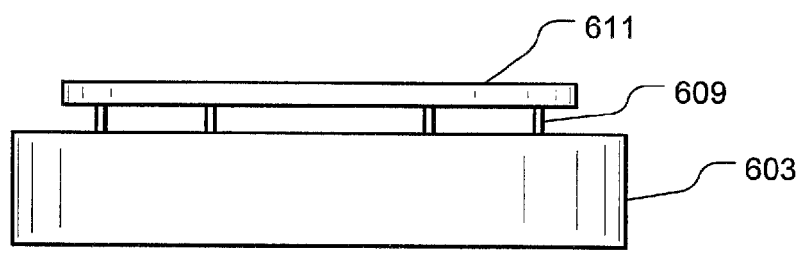
FIGS. 7 and 8 are side views of the bearing system of FIG. 6.
Figure 8:
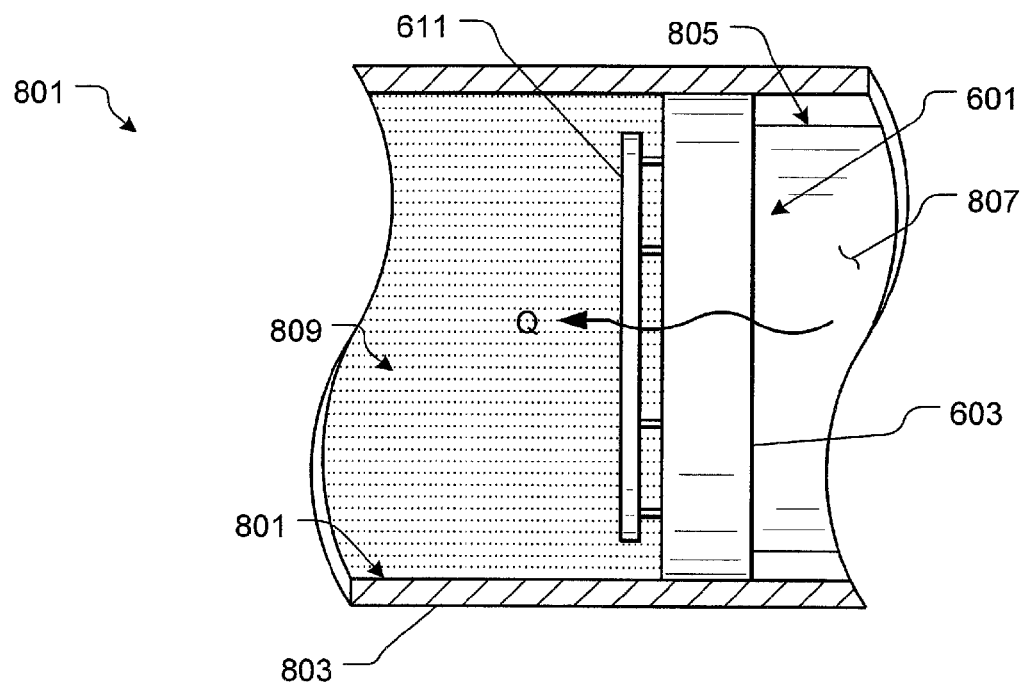

Referring now to FIGS. 6-8 in the drawings, various views of a bearing cooling system 601 is shown in accordance with an alternative embodiment of the present application. System 601 is substantially similar in form and function to system 301. In the illustrated embodiment, system 601 is operably associated with a bearing 602 having an outer ring 603, an inner ring 605, and a plurality of roller balls disposed between the two rings. Like system 301, a plurality of heat pipes 609 are utilized to transfer the heat energy between the two surfaces.

One of the unique features of system 601 is the use of an evaporator 611 attached to the heat pipes 609 and configured to increase the heat transfer surface area. In the contemplated embodiment, evaporator 611 is a solid disc spaced at a distance from inner ring 605 and attached to the heat pipes 609; however it will be appreciated that alternative embodiments could utilize evaporators having different shapes and sizes in lieu of a solid disc. Furthermore, it will be appreciated that alternative embodiments could utilize hollow evaporators in gas or fluid communication with a hollow interior of a hollow heat pipe. This feature allows circulation of the fluid disposed within both the evaporator and the heat pipe.

FIG. 8 depicts an exemplary embodiment of system 601 during use. In the exemplary embodiment, the outer ring 603 securely fastens to an inner surface 801 of a conduit 803 while the inner ring 605 securely fastens to an outer surface 805 of a shaft 807. During operation the lubricant 809 in carried within conduit 803. As depicted the evaporator 611 is completely disposed within the lubricant 809 and heat transfer is made between the surfaces of the bearing 602 via the bearing cooling system 601, e.g., the heat pipes and evaporator, as indicated by arrow Q.

It should be understood that FIG. 8 depicts one of many embodiments that could utilize the features of the systems discussed herein, namely, wherein only one side of the bearing is exposed to lubricant. In yet another contemplated embodiment, the cooling system is in fluid communication with a jet stream of lubricant in lieu of the depicted reservoir of lubricant carried within conduit 803.

Figure 9:
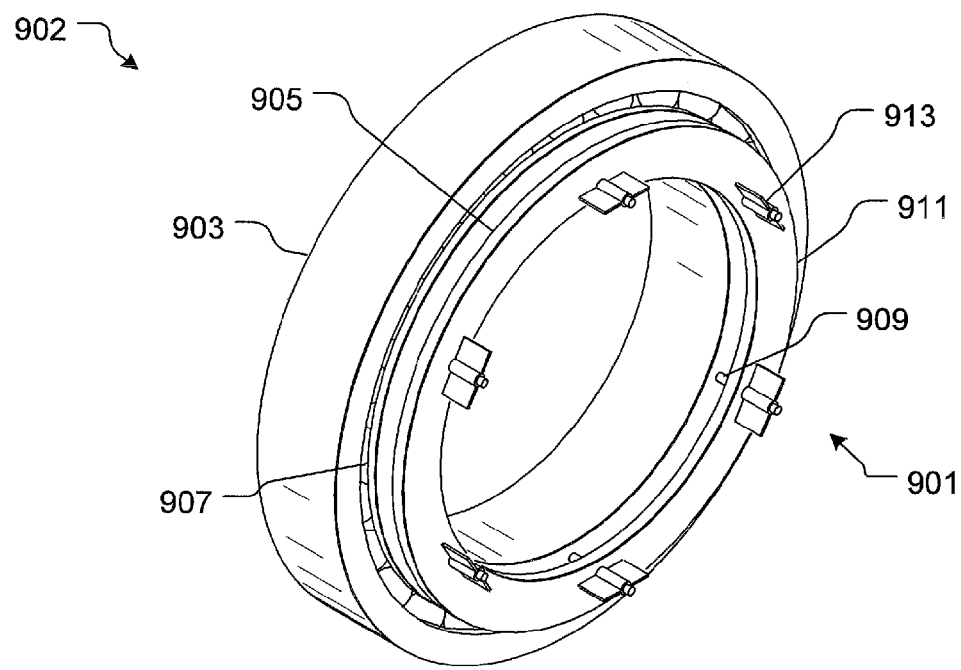
FIG. 9 is an oblique front view of a bearing system in accordance with an alternative embodiment of the present application.

Referring next to FIG. 9 in the drawings, an alternative embodiment of system 601 is shown. System 901 is substantially similar in form and function to system 601 and incorporates the features discussed herein. System 901 is shown operably associated with a bearing 902 having an outer ring 903, an inner ring 905, and a plurality of roller balls 907 disposed therebetween.

In the contemplated embodiment, system 901 utilizes a plurality of heat pipes 909, an evaporator 911, and a plurality of fins secured to the heat fins 913; all three being used to increase the heat transfer surface area.

It is apparent that a system and method with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A cooling system for a bearing having an inner ring rotatably carried within an outer ring, the system comprising:

a heat pipe extending through a thickness of the inner ring from a first surface to an opposing second surface, the heat pipe being configured to protrude from the first surface; and a cooling lubricant in fluid communication with the first surface;

wherein the heat pipe is configured to come into contact with the cooling lubricant and configured to transfer heat energy from the first surface to the second surface.

2. The system of claim 1, further comprising:

a fin attached to the heat pipe and configured to increase heat transfer of the heat pipe.

3. The system of claim 1, further comprising:

an evaporator attached to the heat pipe and configured to increase heat transfer of the heat pipe.

4. The system of claim 3, wherein the evaporator is a disc.

5. The system of claim 4, wherein the disc is solid.

6. The system of claim 3, further comprising:

a fin attached to the heat pipe and configured to increase heat transfer of the heat pipe.

7. The system of claim 1, wherein the bearing is a roller bearing.

8. A roller bearing, comprising:

an outer ring;

an inner ring;

a plurality of roller balls disposed between the outer ring and the inner ring; and a heat pipe extending through a thickness of the inner ring from a first surface to an opposing second surface, the heat pipe being configured to protrude from the first surface;

wherein the heat pipe is configured to come into contact with a cooling lubricant and configured to transfer heat energy from the first surface to the second surface.

9. The roller bearing of claim 8, further comprising:

a fin attached to the heat pipe and configured to increase heat transfer of the heat pipe.

10. The roller bearing of claim 8, further comprising:

an evaporator attached to the heat pipe and configured to increase heat transfer of the heat pipe.

11. The roller bearing of claim 10, wherein the evaporator is a disc.

12. The roller bearing of claim 11, wherein the disc is solid.

13. The roller bearing of claim 10, further comprising:

a fin attached to the heat pipe and configured to increase heat transfer of the heat pipe.

14. A method to cool a roller bearing, comprising:

exposing a first surface of the roller bearing to lubricant; and transferring heat energy from the first surface and an opposing second surface through a plurality of heat pipes extending through a thickness of an inner ring of the roller bearing, the heat pipes are configured to protrude from the first surface, the thickness extending from the first surface to the second surface.

15. The method of claim 14, further comprising:

increasing a heat transfer contact surface area by securing a plurality of fins to the heat pipes.

16. The method of claim 14, further comprising:

increasing a heat transfer contact surface area by securing a disc to the heat pipes.

* * * * *